June 13, 1950 — J. MIHALYI — 2,511,215
FILM AND SHUTTER WINDING MECHANISM
Filed Oct. 17, 1947
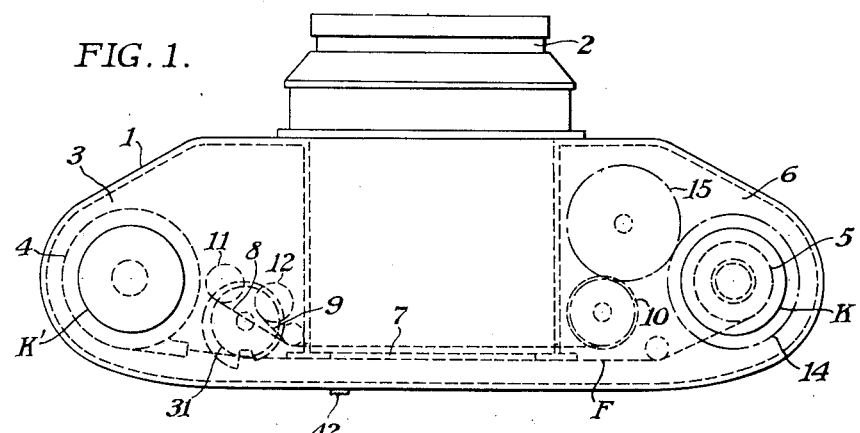
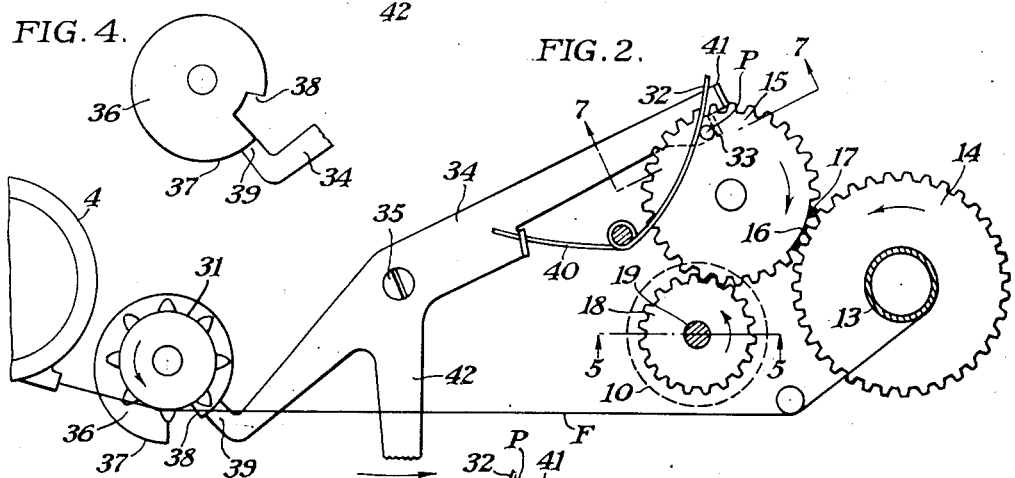
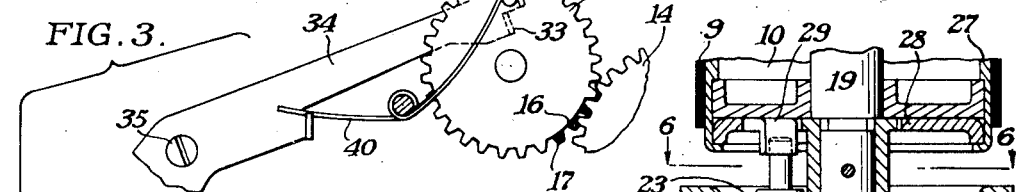
JOSEPH MIHALYI
INVENTOR Patented June 13, 1950

2,511,215

UNITED STATES PATENT OFFICE 2,511,215

FILM AND SHUTTER WINDING MECHANISM

Joseph Mihalyi, Rochester, N. Y., assignor to Eastman Kodak Company, Rochester, N. Y., a corporation of New Jersey Application October 17, 1947, Serial No. 780,512

9 Claims. (Cl. 95—31)

This invention relates to photography, and particularly to roll-film cameras having focal plane or curtain shutters.

Many film-winding mechanisms heretofore employed have been designed so that the traverse of the film onto the receiving spool winds or tensions the shutter. In some of these structures an undue strain is imposed on the film, either through the use of the film as a driver for the mechanism, or because of the constantly-increasing diameter of the wound-up film convolutions.

It is an object of the present invention to avoid the above defects, and to produce a structure that combines a film-winding and metering element, a shutter-winding element, and means for preventing double exposures. It is a further object to render such a structure substantially infallible in the fulfillment of the above functions, by reason of its extreme simplicity. A further object is to permit film to be wound without placing any strain thereon which would be likely to tear, scratch or otherwise damage the surfaces of the film. Another object is to provide means for exact metering of each succeeding frame or picture area, while simultaneously assuring the full winding of the shutter.

A preferred construction for the accomplishment of the above objects and other advances in the art is shown in the accompanying drawings, which, when considered together with the following description, will enable those familiar with camera construction to understand the operation of this particular example and the advantages of the invention in its broad aspects.

In the drawings, wherein like parts in all figures are indicated by corresponding reference characters, Fig. 1 is a top plan of a camera equipped with a film and shutter winding mechanism according to the present invention;

Fig. 2 is a plan of the mechanism per se, with the shutter fully wound;

Fig. 3 is a similar view with the film fully wound;

Fig. 4 is a fragmentary portion showing the start of a succeeding winding operation;

Fig. 5 is a partial vertical section of the shutter winding rolls, as on line 5—5 of Fig. 2;

Fig. 6 is a horizontal section on line 6—6 of Fig. 5, and

Fig. 7 is a section on line 7—7 of Fig. 2.

The invention is illustrated as embodied in a camera of well-known type, having an elongated body 1, a lens assembly 2, a film supply chamber 3 containing a supply casette 4, from which the strip of film F is traversed to a windup spool 5 in a chamber 6, after it has passed an exposure frame 7. A knob K may actuate the windup spool 5 and a similar knob K' may be used to rewind the film back into the casette 4.

In Fig. 1 a curtain shutter is indicated, without irrelevant detail, as comprising curtains 8 and 9, both adapted to be rolled up or "wound" onto a revoluble element indicated generally at 10, and to be pulled by spring-actuated rolls 11 and 12, respectively, upon release of the element 10, to cause the curtains, properly spaced, to accomplish an exposure by passing (to the left in Fig. 1) across the aperture 7.

The mechanism for controlling the curtain aperture and the exposure timing forms no part of the present invention, and therefore is not described or further illustrated.

Fixed to a downward extension of the core 13 of the windup spool 5 is a gear 14, meshing with a smaller gear 15. The latter has an untoothed portion 16. Obviously, therefore, when gear 14 is rotated counterclockwise, it will become unmeshed from gear 15 whenever the toothless space 16 lies as shown in Fig. 2.

Fixed to and underlying gear 15 is a gear 17, of the same size as gear 15, but with a full complement of teeth. Gear 17 is constantly meshed with a pinion 18, freely revoluble on the shaft 19 on which the shutter curtain element 10 is mounted. The pinion 18 has a washer 20 staked to it, and an upturned lug 21 on the washer is adapted to engage a pin 22 mounted in a lever 23 which is pivoted at 24 on a sheave 25 and which may be swung on the pivot 25 so that pin 22 may lie at either end of a slot 30. A cable 26 connects the "first" curtain 8 to the sheave, as shown and described in my copending application, Serial Number 697,095 filed September 11, 1946, but now abandoned. The sheave is pinned or otherwise fixed to shaft 19, and therefore may rotate independently of pinion 18.

Also freely revoluble on shaft 19 is a drum 27 on which the "second" curtain 9 is wound. The curtains 8 and 9 are designated "first" and "second" respectively, as indicating the sequence in which they are released after winding.

A lug 29 projects downwardly from the head 28 of drum 27, and is adapted to strike pin 22 when the latter is in its innermost position (Fig. 6) and cam it outwardly to lie in the path of lug 21. at the end of slot 30.

The means for establishing the exposure slot between the curtains, and the release mechanism for drum 27 and sheave 25, are at the upper end of shaft 19, and are not shown in the drawings. It is sufficient, therefore, to state that during the winding of the curtains (counterclockwise in Figs. 1 and 6) lug 21 engages pin 22 and thus rotates drum 27. When the curtains are released and have completed an exposure, lug 29 has cammed pin 22 outwardly, where it again may be picked up by lug 21.

The gears 14, 15, 17 and 18 are so proportioned that the shutter will be fully wound before a new picture area of the film F has been drawn into the exposure aperture 7. Assuming that the parts are in the relation shown in Fig. 3, if the knob K is turned counterclockwise, film will be drawn from cassette 4 across a metering sprocket 31. The circumference of this sprocket equals one picture area plus the usual separation space between successive areas. However, as above stated, the shutter will be fully wound before the sprocket 31 has made a full revolution.

When knob K has been turned far enough to accomplish approximately ⅔ of a revolution of sprocket 31, the untoothed portion 16 of gear 15 comes against gear 14 (Fig. 2) so that gears 15, 17 and 18 stop, with the shutter fully wound, while gear 14 continues to revolve with the core 13 which is transporting the film F and rotating sprocket 31 by the engagement of the sprocket with the film perforations. Just as the part 16 of gear 15 meets gear 14, a pin P on gear 15 wipes past a spring 32, and is pressed thereby against a lug 33 on a lever 34, pivoted at 35, thus creating a positively locked condition in all the gears except 14. The knob K may still be turned to wind film, as gear 14 is now disconnected from the train.

Fixed to the film metering sprocket 31 is a disc 36, having a portion of its periphery in spiral cam form as at 37, and also having a notch 38 in its edge. A bent end 39 of lever 34 is adapted to enter the notch 38 when the sprocket 31 has made a full revolution, that is, when a full new picture area has passed into aperture 7. When the end 39 enters the notch 38 (Fig. 3) one end 40 of spring 32 turns lever 34 clockwise about pivot 35, and lug 33 is moved out of register with pin P. This permits spring 32 to snap the gear 15 around until the first tooth above the space 16 engages the gear 14. Simultaneously pin P is stopped by a second lug 41 on lever 34.

As gears 14 and 15 are now in mesh, knob K cannot be turned any further, so no strain can come on the film from the core 13. Therefore the film cannot be torn by the teeth of sprocket 31, and the latter cannot move in either direction while the end 39 rests in notch 38. The shutter now may be released, and when it has made its full unwinding travel, the lug 29 cams pin 22 outwardly as previously described and places it in register with lug 21 ready for another winding operation.

Before another frame of film may be wound the operator must move an arm 42 that projects from lever 34 to the outside of the camera body 1. This movement swings lug 41 forwardly away from pin P, and the knob K may now be turned freely in the direction indicated in Fig. 2. As soon as it has been turned a few degrees, the disc 36 will have been moved by the film, through sprocket 31, sufficiently to carry notch 38 past the lever end 39, which then will bear on the peripheral portion 37 of the disc. As film is wound further (gears 15 and 14 being now fully in mesh) the lever 34 gradually turns clockwise as the indrawing periphery of the disc permits it to, and lug 33 is again located in the path of the pin P, so that the gear train is stopped just as the shutter is again fully wound.

It should be noted from the above description of a preferred form of the invention that the film is not at any time subjected to tension which might tear or injure it, because just as the film metering sprocket is positively stopped by the lever end 39 the gear train is held against movement by the engagement of pin P and lug 41. Also, the shutter cannot be subjected to undue winding strain because the gears are designed to bring the untoothed part 16 of gear 15 against gear 14 just as the shutter is fully wound. Double exposure of a film area is prevented by interconnecting the shutter winding and film advancing means, so that both the film and shutter are wound simultaneously.

A preferred construction of a film and shutter winding mechanism is shown in the drawings and and described in the foregoing text, but it should be understood that the entire scope of the invention includes any construction and arrangement of parts which will accomplish the objects set forth, provided that such constructions and their operation fall within the terminology of the following claims.

I claim:

1. A film and shutter winding mechanism for a camera having a shutter adapted to be wound by a gear train deriving its movement from a manually rotated film core, wherein one gear of the train becomes unmeshed when the shutter is fully wound, said mechanism including a single pivoted lever spring-pressed to a position to hold the unmeshed gear against rotation; a film metering device adapted to be locked by the lever when a required length of film has passed said metering device; and a spring acting on the unmeshed gear to remesh the gear when the lever has been moved by said spring to lock the metering device as aforesaid, said lever also being adapted to prevent further rotation of the gear until the lever is manually displaced from its locking position.

2. A film- and shutter-winding mechanism for a camera having a shutter with a one-way winding member carrying a gear and a manually operated film core also carrying a gear; the combination of an intermediate gear constantly in mesh with the shutter gears; a mutilated gear coaxial with and fixed to the intermediate gear; a film-metering device; a single pivoted lever between the metering device and the mutilated gear; and a spring acting on the mutilated gear to remesh it with the core gear, said spring also acting on the lever to cause the latter to engage and intercept the film-metering device when a required length of film has been wound, and to hold the mutilated gear in either meshed or unmeshed position; and means for moving the lever to free the gears and the metering device.

3. A film and shutter winding mechanism for cameras comprising, in combination, a shutter having a winding pinion, a film winding core carrying a driving gear, a film metering device engaging with and operable by the film during transport thereof, a gear train between the winding pinion and driving gear including a mutilated gear for engaging and releasing the driving gear according to the position of the mutilated portion, a gear fixed to the mutilated gear and constantly meshed with the shutter winding pinion, a pivoted lever moveable to and from an operative and stop position to engage the mutilated gear and the film metering device to prevent movement thereof, a spring bearing on the lever and mutilated gear tending to turn the latter toward its gear engaging position and tending to move the lever to its stop position, the lever including a lug for intercepting the mutilated gear when the mutilated portion thereof lies opposite the driving gear, said lever having a second position engaging and holding the mutilated gear with the mutilated portion moved past the driving gear to mesh the mutilated and driving gears, thereby locking the mutilated and driving gears against movement, and means for moving the lever manually to an inoperative position out of contact with the metering device and mutilated gear.

4. A film and shutter winding mechanism for cameras comprising, in combination, a shutter having a winding pinion; a film core carrying a driving gear; a gear train between the driving gear and the pinion including a mutilated gear engageable with the driving gear and disengageable therefrom; a film metering device; a lever movable to two locking positions and an unlocked position; a spring biasing the lever toward its locking positions, said spring also tending to rotate the mutilated gear to engage the driving gear, said lever, metering device and mutilated gear being positioned so that the lever in its first position engages and locks the shutter winding gears when the shutter is wound, and in its second position engaging and locking the metering device after a required area of film is transported, said lever having a position locking the mutilated gear while in engagement with the driving gear.

5. A film and shutter winding mechanism for cameras comprising, in combination, a shutter having a winding pinion; a film core carrying a driving gear; a gear train between the driving gear engageable with the driving gear and disengageable therefrom and the pinion including a mutilated gear; an intermediate gear fixed to the mutilated gear and constantly meshed with the winding pinion; a film metering device, a pivoted lever having lugs at one end to engage said mutilated gear and a lug at another end to engage and lock the metering device; a spring acting on the lever and on the mutilated gear in such manner that when the latter is disengaged from the driving gear the mutilated gear is locked by one lug on the lever and held against the lug by the spring, said mutilated gear having another position in which it is re-engaged with the driving gear and again locked by the lever and the spring; the lever simultaneously locking the metering device; and means for moving the lever from its locking positions to release the locked elements.

6. A film and shutter winding mechanism for cameras comprising, in combination, a shutter having a winding pinion; a film core carrying a driving gear, a gear train between the driving gear engageable with the driving gear and disengageable therefrom and the pinion including a mutilated gear; an intermediate gear fixed to the mutilated gear and constantly meshed with the winding pinion; a film metering device, a pivoted lever having end lugs and a spring acting thereon, said lever being movable by the spring to two positions, whereby in the first position the spring coacts with the lever to hold the mutilated gear against rotation and out of engagement with the driving gear, and in the second position the spring coacts with a second lug to hold the mutilated gear against rotation and in engagement with the driving gear, the lever coincidentally locking the metering device; and manual means for moving the lever to a third position to release the locked members.

7. A film and shutter winding mechanism for cameras comprising, in combination, a shutter having a winding pinion; a film core carrying a driving gear; an intermediate gear train including a mutilated gear which engages the driving gear during winding and is disengaged therefrom when the shutter is fully wound; a film metering device; a lever movable to lock the mutilated gear and the metering device; spring means biasing the lever to different locking positions, said spring means also tending to rotate the mutilated gear to re-engage it with the driving gear when the metering device is locked; and means for releasing the mutilated gear and the metering device by a manual movement of the lever.

8. A film and shutter winding mechanism for cameras comprising in combination, a shutter; a film core; a driving connection between the film core and the shutter including a driving gear on the core, a pinion on the shutter, a mutilated gear engageable with the driving gear and disengageable therefrom, and an intermediate gear fixed to the mutilated gear and constantly meshed with the shutter pinion; a film metering device; a single pivoted lever; a spring tending to move the lever toward the mutilated gear and toward the film metering device, said spring also acting to bias the mutilated gear to mesh with the driving gear; lugs on the lever adapted to intercept the mutilated gear and hold it either meshed or unmeshed and to lock the metering device, said lever, metering device and mutilated gear being so related that the lever locks the shutter winding gears when the shutter is wound and then locks the metering device after a required area of film is transported, the lever also being manually movable to release the locked members.

9. A mechanism as set forth in claim 4, wherein the film metering device includes a cam arranged to control the spring-actuated movement of the lever to establish the gear-locking positions of the lever.

JOSEPH MIHALYI.

REFERENCES CITED

The following references are of record in the file of this patent:

UNITED STATES PATENTS

| Number | Name | Date |
|---|---|---|
| 2,039,517 | Block | May 5, 1936 |
| 2,148,636 | Muller et al. | Feb. 28, 1939 |
| 2,150,642 | Wachtler | Mar. 14, 1939 |
| 2,226,161 | Drotning | Dec. 24, 1940 |
| 2,304,887 | Crumrine | Dec. 15, 1942 |
| 2,364,466 | Nagel | Dec. 5, 1944 |

FOREIGN PATENTS

| Number | Country | Date |
|---|---|---|
| 661,992 | Germany | July 1, 1938 |
| 495,276 | Great Britain | Nov. 10, 1938 |
| 874,429 | France | May 4, 1942 |